United States Patent
Kim (10) Patent No.: US 9,961,627 B2
(45) Date of Patent: May 1, 2018

(54) DEVICE AND METHOD FOR PERFORMING MACHINE-TO-MACHINE COMMUNICATION

(71) Applicant: LG Electronics Inc., Seoul (KR)

(72) Inventor: Jungwoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 14/408,474

(22) PCT Filed: Sep. 27, 2013

(86) PCT No.: PCT/KR2013/008709
§ 371 (c)(1),
(2) Date: Dec. 16, 2014

(87) PCT Pub. No.: WO2014/051390
PCT Pub. Date: Apr. 3, 2014

(65) Prior Publication Data
US 2015/0215861 A1 Jul. 30, 2015

Related U.S. Application Data

(60) Provisional application No. 61/706,754, filed on Sep. 27, 2012.

(30) Foreign Application Priority Data

Sep. 26, 2013 (KR) ........................ 10-2013-0114538

(51) Int. Cl.
*H04W 48/20* (2009.01)
*H04W 4/00* (2018.01)
(Continued)

(52) U.S. Cl.
CPC .......... *H04W 48/20* (2013.01); *H04L 67/104* (2013.01); *H04L 67/1044* (2013.01);
(Continued)

(58) Field of Classification Search
None
See application file for complete search history.

(56) References Cited

U.S. PATENT DOCUMENTS

2012/0106375 A1  5/2012 Woo
2012/0218918 A1*  8/2012 Takae ............... H04W 8/005
                                                    370/255
(Continued)

FOREIGN PATENT DOCUMENTS

CN  101951392 A  1/2011
CN  102550119 A  7/2012
(Continued)

OTHER PUBLICATIONS

Wi-Fi Alliance, "Wi-Fi Certified Miracast: Extending the Wi-Fi experience to seamless video display", Sep. 19, 2012, Wi-Fi Alliance.*

(Continued)

*Primary Examiner* — Mohammad S Adhami
(74) *Attorney, Agent, or Firm* — Birch, Stewart, Kolasch & Birch, LLP (57) ABSTRACT

Disclosed are a method and a device for performing machine-to-machine communication. The method for performing communication according to the present invention comprises: a step of searching a second device for supporting machine-to-machine communication; a step of receiving an access network query protocol (ANQP) message from the found second device; a step of determining whether a mirroring service is supported based on the ANQP message received from the second device; a step of acquiring infor- (Continued)

mation on the service of the second device from the ANQP message if it is determined that the second device supports the mirroring service; and a step of determining either a first device or the second device as a group owner based on the acquired information on the service of the second device and the information on the service of the first device.

5 Claims, 5 Drawing Sheets

(51) Int. Cl.
| | |
|---|---|
| H04W 8/00 | (2009.01) |
| H04W 76/02 | (2009.01) |
| H04W 48/14 | (2009.01) |
| H04L 29/08 | (2006.01) |
| H04W 4/08 | (2009.01) |
| H04W 84/20 | (2009.01) |
| H04W 84/12 | (2009.01) |
| H04W 88/08 | (2009.01) |
| H04M 1/60 | (2006.01) |

(52) U.S. Cl.
CPC .............. *H04L 67/16* (2013.01); *H04W 4/005* (2013.01); *H04W 4/008* (2013.01); *H04W 4/08* (2013.01); *H04W 8/005* (2013.01); *H04W 48/14* (2013.01); *H04W 76/023* (2013.01); *H04W 84/20* (2013.01); *H04M 1/6091* (2013.01); *H04W 84/12* (2013.01); *H04W 88/08* (2013.01)

(56) References Cited

U.S. PATENT DOCUMENTS

| | | | | |
|---|---|---|---|---|
| 2013/0013148 | A1* | 1/2013 | Park | G07C 5/00 |
| | | | | 701/36 |
| 2013/0034023 | A1* | 2/2013 | Jung | H04L 67/104 |
| | | | | 370/255 |
| 2013/0040576 | A1* | 2/2013 | Yoon | H04W 8/005 |
| | | | | 455/41.2 |
| 2013/0089006 | A1* | 4/2013 | Huang | H04B 7/26 |
| | | | | 370/259 |
| 2013/0106750 | A1* | 5/2013 | Kurosawa | G06F 9/4445 |
| | | | | 345/173 |
| 2013/0274997 | A1* | 10/2013 | Chien | G06F 17/00 |
| | | | | 701/36 |
| 2014/0078022 | A1* | 3/2014 | Dusterhoff | G06F 3/1423 |
| | | | | 345/3.1 |

FOREIGN PATENT DOCUMENTS

| | | |
|---|---|---|
| CN | 102598618 A | 7/2012 |
| CN | 102695288 A | 9/2012 |
| EP | 2 503 840 A1 | 9/2012 |
| KR | 20020009283 A | 2/2002 |
| KR | 20050063750 A | 6/2005 |
| KR | 20060098360 A | 9/2006 |
| KR | 20080087640 A | 10/2008 |

OTHER PUBLICATIONS

International Search Report dated Dec. 31, 2013.

* cited by examiner

DEVICE AND METHOD FOR PERFORMING MACHINE-TO-MACHINE COMMUNICATION

CROSS-REFERENCE TO RELATED APPLICATION

This application is the National Stage of International Application No. PCT/KR2013/008709, filed Sep. 27, 2013, which claims the benefit under 35 U.S.C. § 119(e) of U.S. Provisional Application 61/706,754 filed on Sep. 27, 2012, the contents of both of which are hereby incorporated by reference in their entirety.

BACKGROUND OF THE DISCLOSURE

Technical Field

The present invention relates to a device-to-device communication, and more particularly, to an apparatus for performing a communication using Wi-Fi Direct and method thereof.

Background Art

Device-to-device (hereinafter abbreviated D2D) communications may include Wi-Fi Direct, Bluetooth, Zigbee and the like. In this case, Wi-Fi is 'Wireless LAN' and indicates a communication network for performing high-speed Internet nearby an access device (AP) installed spot. Wi-Fi Direct is a new version of an existing Wi-Fi and indicates a communication technology for connecting devices to each other by Wi-Fi without Internet network. And, Wi-Fi Direct does not require a hot spot, a router, an access point (AP) and the like. If a device supportive of Wi-Fi Direct is provided, devices are directly connected to each other to exchange files or share a communication network.

Thus, Wi-Fi Direct is a sort of a direct communication between Wi-Fi loaded devices without an AP (access point) supportive of an access between Wi-Fi alliance devices.

Wi-Fi Direct adopts a system of connecting two devices to each other one to one. Namely, by Wi-Fi Direct, a smartphone and a smartphone, a notebook and a mouse, or a tablet PC and a printer are directly connected to each other. By Wi-Fi Direct, a photo, a music or a video saved in one smartphone is easily transmitted to another smartphone, a document or photo saved in a tablet PC is directly printed, contacts are synchronized between a PC and a smartphone, or game machines are directly connected to each other for enjoying a game.

Several devices can be connected to a single device. For instance, a monitor, a printer, a digital camera and a mouse are collectively connected to a notebook computer supportive of Wi-Fi Direct. In doing so, if the notebook computer is connected to an existing Wi-Fi network, other devices connected to the notebook computer can make Internet accesses to the Wi-Fi network in the same manner. Yet, a one-to-many system is optionally provided.

Meanwhile, when an initial connection is established, Wi-Fi Direct equipments mutually determine an equipment supposed to operate as an AP. To this end, a method of connecting devices in Wi-Fi Direct is described as follows. First of all, as Wi-Fi Direct supportive devices transceive control messages in-between, they can mutually recognize that which device supports Wi-Fi Direct and informations required for a mutual access are delivered through control messages. In doing so, two different Wi-Fi Direct devices perform a procedure for negotiating that a prescribed one of the Wi-Fi Direct devices plays a role as a group owner. In this case, the group owner means a device that plays a role as an AP by gaining a control over a connected device belonging to a device group configuring a Wi-Fi Direct network. According to the negotiation, a group owner role is determined in a manner of exchanging a group owner intent value of each of the two devices.

However, since an existing Wi-Fi Direct connection generally determines a group owner by comparing preset group owner intent values set to transmit random values, it may cause a problem that an efficient network connection is not available (e.g., controlling a specific device to become a group owner, etc.).

DISCLOSURE OF THE INVENTION

Technical Task

To solve the above-mentioned problems, the technical task of the present invention is to provide a communication performing method of determining a group owner in consideration of a service information included in an ANQP (access network query protocol) in establishing Wi-Fi Direct connection.

Another technical task of the present invention is to provide a device and communication performing method for dynamically changing a group owner intent value to correspond to a group owner determined appropriately for a specific network situation.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of performing a device-to-device (D2D) communication of a $1^{st}$ device according to one embodiment of the present invention, including the steps of discovering a $2^{nd}$ device supportive of the D2D communication, receiving an ANQP (access network query protocol) message from the discovered $2^{nd}$ device, determining whether a mirroring service is supported based on the received ANQP message of the $2^{nd}$ device, if the $2^{nd}$ device supports the mirroring service as a result of the determining step, obtaining a service information of the $2^{nd}$ device from the ANQP message, and determining either the $1^{st}$ device or the $2^{nd}$ device as a group owner based on the obtained service information of the $2^{nd}$ device and a service information of the $1^{st}$ device.

Preferably, the method may further include the steps of receiving a group owner intent value of the $2^{nd}$ device from the $2^{nd}$ device, setting a group owner intent value of the $2^{nd}$ device by comparing the group owner intent value of the $1^{st}$ device and the group owner intent value of the $2^{nd}$ device to each other in order for the group owner intent value of a device determined as the group owner to have a greater value, and transmitting the set group owner intent value of the $1^{st}$ device to the $2^{nd}$ device.

More preferably, if the $1^{st}$ device is determined as the group owner, the step of setting the group owner intent value of the 1st device may include the steps of comparing the group owner intent value of the $1^{st}$ device and the group owner intent value of the $2^{nd}$ device to each other and if the group owner intent value of the $1^{st}$ group is smaller than the group owner intent value of the $2^{nd}$ device as a result of the comparison, setting the group owner intent value of the $1^{st}$ device to be greater than the group owner intent value of the $2^{nd}$ device.

More preferably, if the $1^{st}$ device is determined as a client of the group, the step of setting the group owner intent value of the $1^{st}$ device may include the steps of comparing the group owner intent value of the $1^{st}$ device and the group owner intent value of the $2^{nd}$ device to each other and if the group owner intent value of the $1^{st}$ group is greater than the group owner intent value of the $2^{nd}$ device as a result of the comparison, setting the group owner intent value of the $1^{st}$ device to be smaller than the group owner intent value of the $2^{nd}$ device.

Preferably, the service information may include at least one of a type information indicating a server device or a client device, a network support information, a network required information and a network setup information.

Preferably, the ANQP message may be extracted from a query request field of a GAS (generic advertisement service) protocol message of a Wi-Fi service discovery procedure.

Preferably, the service information may be obtained from a query data field of the ANQP message.

In a $2^{nd}$ technical aspect of the present invention, provided herein is a $1^{st}$ device for performing a device-to-device (D2D) communication, including a receiver configured to discover a $2^{nd}$ device supportive of the D2D communication, the receiver configured to receive an ANQP (access network query protocol) message from the discovered $2^{nd}$ device and a processor determining whether a mirroring service is supported based on the received ANQP message of the $2^{nd}$ device, the processor, if the $2^{nd}$ device supports the mirroring service as a result of the determination, obtaining a service information of the $2^{nd}$ device from the ANQP message, the processor determining either the $1^{st}$ device or the $2^{nd}$ device as a group owner based on the obtained service information of the $2^{nd}$ device and a service information of the $1^{st}$ device.

Preferably, the receiver may receive a group owner intent value of the $2^{nd}$ device from the $2^{nd}$ device and wherein the processor sets a group owner intent value of the $2^{nd}$ device by comparing the group owner intent value of the 1st device and the group owner intent value of the 2nd device to each other in order for the group owner intent value of a device determined as the group owner to have a greater value.

More preferably, if the 1st device is determined as a client of the group, the processor may compare the group owner intent value of the 1st device and the group owner intent value of the 2nd device to each other. If the group owner intent value of the 1st group is greater than the group owner intent value of the 2nd device as a result of the comparison, the processor may set the group owner intent value of the 1st device to be smaller than the group owner intent value of the 2nd device.

More preferably, if the $1^{st}$ device is determined as the group owner, the processor may compare the group owner intent value of the $1^{st}$ device and the group owner intent value of the $2^{nd}$ device to each other. If the group owner intent value of the $1^{st}$ group is smaller than the group owner intent value of the $2^{nd}$ device as a result of the comparison, the processor may set the group owner intent value of the $1^{st}$ device to be greater than the group owner intent value of the $2^{nd}$ device.

More preferably, the $1^{st}$ device may further include a transmitter configured to transmit the set group owner intent value of the $1^{st}$ device to the $2^{nd}$ device.

Advantageous Effects

A communication performing method according to the present invention maintains an existing Wi-Fi Direct function and also determines and sets a group owner using a service information included in an ANQP (access network query protocol) message.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

The following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE (institute of electrical and electronics engineers) 802.16 system or 3GPP ($3^{rd}$ generation partnership project), they are applicable to other random mobile communication systems except unique features of 3IEEE 802.16 system and 3GPP.

Occasionally, to prevent the present invention from getting vaguer, structures and/or devices known to the public are skipped or can be represented as block diagrams centering on the core functions of the structures and/or devices.

Besides, in the following description, assume that a terminal device is a common name of such a mobile or fixed user stage device as a user equipment (UE), a mobile station (MS), an advanced mobile station (AMS), and the like. Informations transmitted or received by a terminal device may include data and various control informations. And, various kinds of physical channels may exist in accordance with types and usages of the informations transmitted or received by the terminal device.

Reference will now be made in detail to the preferred embodiments of the present invention, examples of which are illustrated in the accompanying drawings. Detailed description disclosed together with the accompanying drawings is intended to explain not a unique embodiment of the present invention but an exemplary embodiment of the present invention.

The present invention relates to a terminal device supportive of a device-to-device (D2D) communication. In this case, the D2D communication may include one of Wi-Fi Direct, Bluetooth, Zigbee and the like. For clarity, the following description is made by limiting the D2D communication to Wi-Fi Direct.

Figure 1:
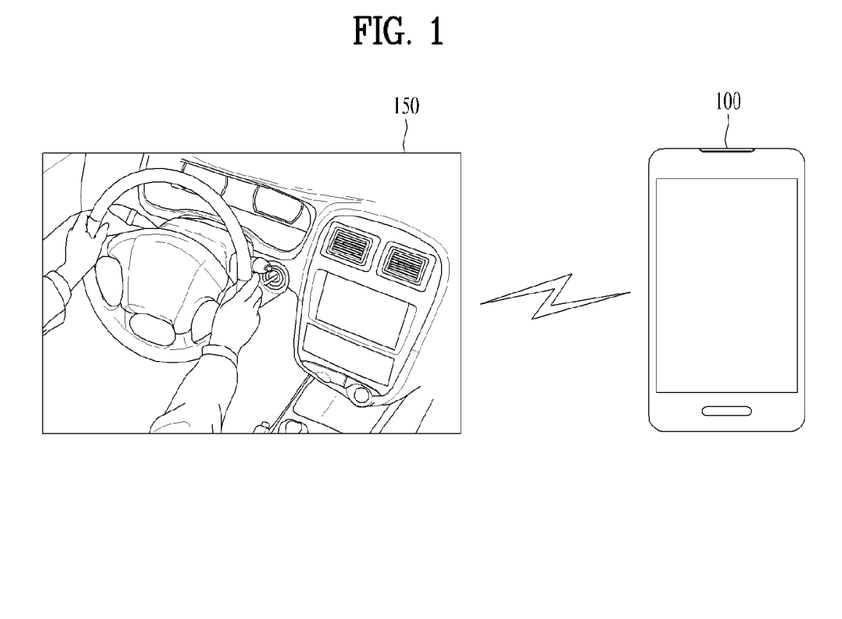
FIG. 1 is a diagram for a configuration of a Wi-Fi Direct network.

FIG. 1 is a diagram for a configuration of a Wi-Fi Direct network.

First of all, Wi-Fi is a wireless communication technology globally used under the 802.11 Standard of IEEE and currently applies to various devices including a notebook computer, a mobile phone, a console game machine, an MP3, a camera, a printer and the like. Wi-Fi is recognized as a representative technology of Wireless LAN for an access to Internet and means a technology capable of performing a communication centering on an access point (AP). Hence, Wi-Fi installed on various devices is configured to perform a communication only if gaining an access to an AP regarded as a network access point.

Yet, Wi-Fi Alliance (WFA) proposed a new standard 'Wi-Fi Direct' supportive of P2P (peer to peer) between Wi-Fi. The Wi-Fi Direct is a wireless communication technology that enables a direct communication between Wi-Fi loaded devices without passing through AP (access point) supportive of an access between Wi-Fi devices.

A basic connection method of Wi-Fi Direct enables a one-to-one connection between two devices. Namely, a mobile phone and a mobile phone, a notebook computer and a mouse, or a tablet PC and a printer are directly connected to each other by Wi-Fi Direct. Thus, a photo, a music or a video saved in one smartphone is easily transmitted to another smartphone, a document or photo saved in a tablet PC is directly printed, contacts are synchronized between a PC and a smartphone, or game machines are directly connected to each other for enjoying a game.

Referring to FIG. 1, a mobile user equipment 100 and a vehicle head unit 150 can communicate with each other using a Wi-Fi Direct technology. Thus, the Wi-Fi Direct technology connects the mobile user equipment 100 and the vehicle head unit 150 to each other, whereby a navigation, a TV output, a music play, a social service, a vehicle information display and the like can be shared between the mobile user equipment 100 and the vehicle head unit 150. Such a sharing function between the mobile user equipment 100 and the vehicle head unit 150 can be named a mirroring. Using a mirroring service, applications saved in the mobile terminal 100 can be run in the vehicle head unit 150.

Meanwhile, according to the description with reference to FIG. 1, a single mobile user equipment 100 and a single vehicle head unit 150 are connected to each other using Wi-Fi Direct. Yet, in some cases, a plurality of mobile user equipments and a single vehicle head unit can be connected using Wi-Fi Direct, or a single mobile user equipment and a plurality of vehicle head units can be connected using Wi-Fi Direct.

According to another embodiment, a monitor, a printer, a digital camera and a mouse are collectively connected to a notebook computer supportive of Wi-Fi Direct. In doing so, if the notebook computer is connected to an existing Wi-Fi network, other devices connected to the notebook computer can make Internet accesses to the Wi-Fi network in the same manner. Yet, a one-to-many system is optionally provided.

Figure 2:
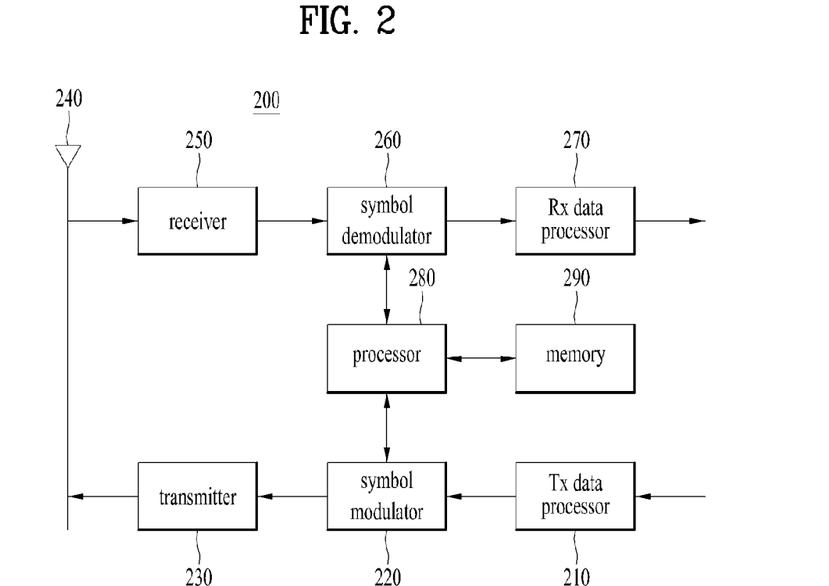
FIG. 2 is a block diagram for a device configured to perform a communication using Wi-Fi Direct.

FIG. 2 is a block diagram for a device 200 configured to perform a communication using Wi-Fi Direct. The Wi-Fi Direct supportive mobile user equipment 100 and the Wi-Fi Direct supportive vehicle head unit 150 shown in FIG. 1 can include all configurations of the device 200 described with reference to FIG. 2.

Referring to FIG. 2, a device 200 may include a transmitted (Tx) data processor 210, a symbol modulator 220, a transmitter 230, a transceiving antenna 240, a receiver 250, a symbol demodulator 260, a received data processor 270, a processor 280 and a memory 290. Although the device 200 includes a single antenna 240 shown in the drawing, the device 200 may include a plurality of antennas. Therefore, the device 200 according to the present invention supports an MIMO (multiple input multiple output) system. And, the device 200 according to the present invention can support both SU-MIMO (single user-MIMO) and MU-MIMO (multi user-MIMO) systems.

The transmitted data processor 210 receives traffic data, performs coding on the received traffic data by formatting, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 230. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 230 receives the stream of the symbols, converts the received stream to at least one or more analog signals and then generates a downlink signal suitable for a transmission on a radio channel by additionally adjusting the analog signals (e.g., amplification, filtering, frequency upconverting, etc.). If so, the transmitting antenna 240 transmits the generated signal to another device.

Meanwhile, the receiving antenna 240 receives a signal from another device and then provides the received signal to the receiver 250. Subsequently, the receiver 250 adjusts the received signal (e.g., filtering, amplification and frequency downconverting) and then obtains samples by digitizing the adjusted signal. The symbol demodulator 260 demodulates the received pilot symbols and then provides them to the processor 280 for channel estimation.

Moreover, the symbol demodulator 260 receives a frequency response estimated value from the processor 280, obtains data symbol estimated values (i.e., estimated values of the transmitted data symbols) by performing data demodulation on the received data symbols, and then provides the data symbol estimated values to the received (Rx) data processor 270. Subsequently, the received data processor 270 reconstructs the transmitted traffic data by performing demodulation (i.e., symbol demapping), deinterleaving and decoding on the data symbol estimated values.

The processing by the symbol demodulator 260 and the received data processor 270 is complementary to the processing by the symbol modulator 220 and the transmitted data processor 210.

The processor 280 directs operations (e.g., control, adjustment, management, etc.) in the device 200. The processor 280 may be connected to the memory unit 290 configured to store program codes and data. The memory 290 is connected to the processor 280 to store operating systems, applications and general files.

The processor 280 may be called one of a controller, a microcontroller, a microprocessor, a microcomputer and the like. Meanwhile, the processor 280 may be implemented using hardware, firmware, software and/or any combinations thereof. In case of implementing an embodiment of the present invention using hardware, the processor 280 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the functions and/or operations of the present invention. And, the firmware or software configured to implement the present invention is loaded on the processor 280 or saved in the memory 290 to be driven by the processor 280.

In addition to the components shown in FIG. 2, the device 200 according to the present invention can further include various components if necessary. For instance, if the device 200 is a mobile user equipment, it may further include such components as an A/V (audio/video) input unit configured to receive inputs of audio and video signals by including a camera, a microphone and the like, a user input unit configured to receive an input of a user's operation control by including buttons, touch sensors, a keypad and the like, a sensing unit configured to detect such current states of a mobile terminal as a location, a direction, an acceleration, a deceleration, a presence or non-presence of a contact with a user and the like, an output unit configured to generate outputs related to a visual sense, an auditory sense, a haptic sense or the like by including a display, a speaker, a haptic motor and the like, an interface unit configured to connect to external devices by including a wired/wireless headset port, an external charger port, an earphone port, a memory card port and the like, a power supply unit configured to supply powers required for operations of the respective components by being provided with an external or internal power under the control of a processor, and the like.

An embodiment related to a wireless communication method implemented in the above-configured device shall be described in detail with reference to the accompanying drawing as follows.

For clarity of the following description, assume that a device for performing a device-to-device (D2D) communication includes at least one of the components shown in FIG. 2. In the following description, a 1st device and a 2nd device are provided to conceptionally describe a device having the present invention applied thereto in aspect of a receiving side or a transmitting side. And, assume that the 1st device and the 2nd device belong to the same network group.

In particular, in the components shown in FIG. 2, a 1st device for performing a D2D communication according to the present invention includes a receiver configured to discover a 2nd device supportive of the D2D communication and to receive an ANQP (access network query protocol) message from the discovered 2nd device and a processor configured to determine a presence or non-presence of a support of a mirroring service based on the received ANQP message of the 2nd device, the processor, if the 2nd device supports the mirroring service as a result of the determination, obtaining a service information of the 2nd device. In this case, the processor can determine one of the 1st device and the 2nd device as a group owner based on the obtained service information of the 2nd device and a service information of the 1st device.

Meanwhile, according to one embodiment of the present invention, the receiver can receive a group owner intent value of the 2nd device from the 2nd device. In order for a group owner intent value of a device determined as the group owner to have a greater value, the processor is able to set the group owner intent value of the 1st device by comparing the group owner intent value of the 1st device and the group owner intent value of the 2nd device to each other.

In some cases, the 1st device can be designed with a configuration that further includes a transmitter configured to transmit the set group owner intent value of the 1st device to the 2nd device.

Moreover, the 1st device may further include a memory configured to store the group owner intent value of the 1st device, the service information of the 1st device, the service information received from the 2nd device and the group owner intent value of the 2nd device.

Based on the above-mentioned assumptions, a method of determining a group owner of Wi-Fi Direct according to the present invention is described in detail with reference to FIG. 3 as follows.

Figure 3:
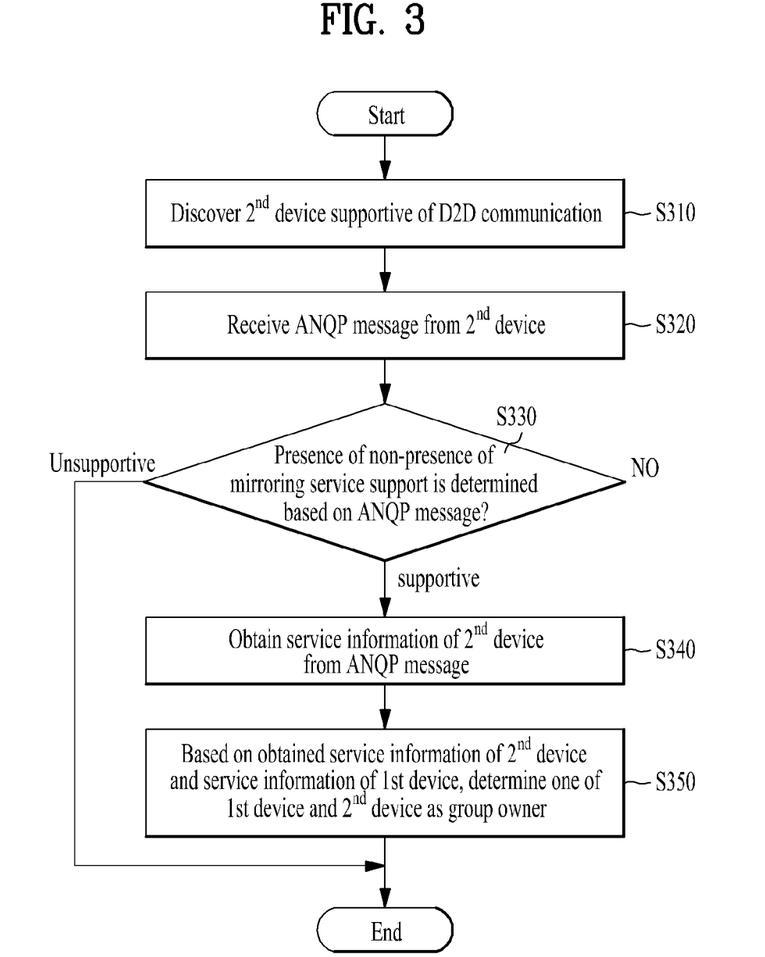
FIG. 3 is a flowchart to describe a method of determining a group owner of Wi-Fi Direct according to one embodiment of the present invention.

Referring to FIG. 3, a 1st device according to one embodiment of the present invention discovers a 2nd device supportive of Wi-Fi Direct [S310]. In particular, the 1st device can detect the 2nd device supportive of the Wi-Fi Direct in a manner of detecting a beacon signal transmitted from the 2nd device nearby and then executes a device discovery procedure. In doing so, information between the 1st device and the 2nd device can be transceived in a manner of being saved as an information element (IE).

Through the step S310, the 1st device can receive an ANQP (access network query protocol) message from the discovered 2nd device [S320]. In this case, the ANQP (access network query protocol) message means a message of a protocol for requesting an information for a network connection and then making a response. The above-described ANQP message can be defined in IEEE 802.11u Standard and may be sent by being included in a GAS (generic advertisement service) protocol message of the service discovery procedure. The GAS protocol message shall be described in detail with reference to FIG. 7 later. According to one embodiment of the present invention, the 1st device and the 2nd device can exchange service information with each other using the ANQP message. One example of a configuration of the ANQP message is shown as Table 1 in the following.

TABLE 1

| ANQP Vendor-specific Content | | | | | |
|---|---|---|---|---|---|
| OUI Subtype | Service Update Indicator | Length | Service Protocol Type | Service Transaction ID | Query Data |

Service Protocol Type field shown in Table 1 can provide an information indicating what kind of service is supported as shown in Table 2 in the following. A value shown in Table 2 is a random value and may be defined as an actually different value. Each of the $1^{st}$ device and the $2^{nd}$ device can be aware that a counterpart device supports a prescribed service using the ANQP message including the value shown in Table 2.

TABLE 2

| value | Meaning |
|---|---|
| 0 | All Service Protocol Type |
| 1 | Bonjour |
| 2 | UPnP |

TABLE 2-continued

| value | Meaning |
|---|---|
| 3 | WS-Discovery |
| 4 | Mirror Link |
| 5-254 | Reserved |
| 255 | Vendor Specific |

After the step S320, the $1^{st}$ device can determine a presence or non-presence of a support of a mirroring service based on the ANQP message [S330]. As mentioned in the foregoing description, it is able to determine the presence or non-presence of the support of the mirroring service by checking the value of the Service Protocol Type field of the ANQP message. For instance, when Service Protocol Type is defined as shown in Table 2, if the field has the value of '4', it is able to determine that the mirroring service is supported.

If the $2^{nd}$ device does not support the mirroring service ['Unsupportive' in S330], the routine can go to a group owner negotiation step in accordance with a general Wi-Fi Direct connectivity. If the $2^{nd}$ service supports the mirroring service ['Supportive' in S330], the service information of the $2^{nd}$ device can be obtained from the ANQP message received from the 2nd device [S340]. In this case, the service information may be a mirroring service information and may include at least one of a type information indicating a server device or a client device, a network support information, a network required information and a network setup information.

According to the present invention, the type information is the information indicating a server device operable as a server on a network or a client device operable as a client on the network.

The network support information means an information on a network supported by a device. For instance, the network support information can include such information as a list of network types supported by a device, a presence or non-presence of a network extension or internet connectivity support to a connected device, and the like.

And, the network required information means an information indicating whether a network connection is required for a device operation. For instance, the network required information may mean an information indicating whether an internet access is required for an operation of a device.

A network state information means an information on an overall state and setup of a network. For instance, the network state information may include such information as network connectivity state information, signal strength information, multiple connectivity support/non-support, and the like.

In particular, Query Data field of the ANQP message shown in Table 1 can include service information of a device as shown in Table 3 in the following.

TABLE 3

| | | Query Data | | |
|---|---|---|---|---|
| ML version | ML device Type | Internet Connectivity Sharing Required | Internet Access available | Multiple ML server support |
| The Mirror Link version that P2P device supports | Indicate ML device type of the P2P device. 0 means ML server and 1 means ML Client | Indicates if P2P Device requires Internet Connectivity sharing from other P2P devices. 0 means it is not required. 1 means it is required. | Indicate if P2P device has Internet access. 0 means it does not have the access. 1. 0 means it has the access. | Indicates if ML client is able to support more than one ML server. 0 means it does not support the feature. 1 means it support the feature. If ML device type is set to 0, which is ML server, this value MUST be set to 0. |

Table 3 shows one example of a service information of a mirroring service corresponding to one of service informations according to one embodiment of the present invention. Referring to Table 3, it can be observed that service information includes a version of a mirroring service (ML version), a type of a mirroring device (ML device type), an internet connectivity/sharing required information (Internet Connectivity Sharing Required), a presence or non-presence of internet access availability (Internet Access available), and a multiple mirroring server support information (Multiple ML server support).

After the step S340, the 1st device can determine one of the 1st device and the 2nd device as a group owner by comparing the received network information of the 2nd device and the network information of the 1st device to each other [S350].

In particular, it is able to extract at least one of the type information, the network support information, the network required information and the network state information from the service information of each of the $1^{st}$ device and the $2^{nd}$ device. And, it is able to determine the group owner by comparing the extracted type informations, network support informations, network required informations and network state informations in accordance with a group owner determination reference. In this case, the group owner determination reference may be saved in the corresponding device in advance. Alternatively, the group owner determination reference can be directly inputted by a user each time a Wi-Fi Direct function is used.

TABLE 4

| | Type information | Network support information | Network required information | Network state information |
|---|---|---|---|---|
| 1st device | Server device | Internet connectivity available. 4G LTE | Required | Strong signal strength in connecting Internet. Multiple connectivity unavailable |
| 2nd device | Client device | Internet connectivity available. GPRS | Unrequired | No Internet access. Weak signal strength. Multiple connectivity available |

For instance, according to the network informations of the 1st and 2nd devices shown in Table 4, the 1st device can determine itself as a group owner in consideration of the type information, the network support information, the network required information and the network state information.

Figure 4:
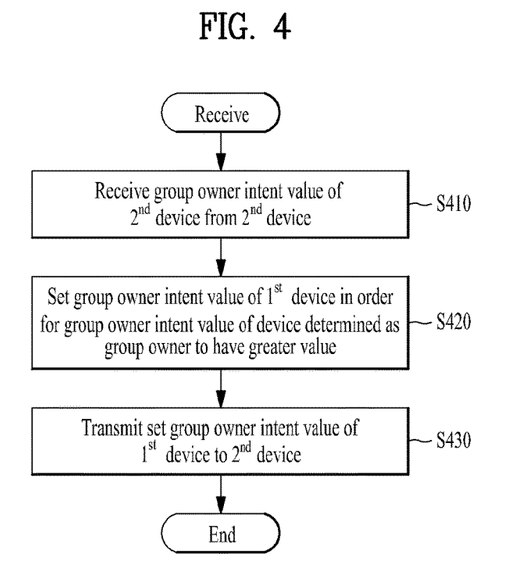
FIG. 4 is a flowchart to describe a method of setting a group owner intent value according to one embodiment of the present invention.

In the following description, a method of setting a group owner intent value is explained in detail with reference to FIG. 4. FIG. 4 shows an operation performed after the step S350 shown in FIG. 3. And, assume that the steps S300 to S350 have been performed already in FIG. 4.

Referring to FIG. 4, the 1st device can receive a message containing a group owner intent value of the 2nd device from the 2nd device [S410]. In particular, the 1st device can receive GO Negotiation Request message from the 2nd device. The service informations shown in Table 2 and Table 3 can be further contained in the GO Negotiation Request message as well as the group owner intent value. In this case, the group owner intent value is the vale used to determine a group owner. Wi-Fi Direct defines that the group owner intent value can be set to minimum 0 to maximum 15.

In order for the device determined as the group owner to have a greater value, the 1st device can set the group owner intent value of the 1st device by comparing the group owner intent value of the 1st device and the group owner intent value of the 2nd device to each other [S420]. In the Wi-Fi Direct, a device having a greater value can be determined in a manner of comparing group owner intent values of the connected devices to each other. Hence, the 1st device can adjust the group owner intent value of the 1st device to correspond to the group owner and client determined in the step S330. Yet, if the group owner intent value corresponds depending on the group owner determined in the step S330, the 1st device can use the same group owner intent value of the 1st device without adjusting the group owner intent value of the 1st device. For instance, if the 1st device is determined as the group owner, the group owner intent value of the 1st device is '10', and the group owner intent value of the 2nd device is '11', the 1st device can adjust the group owner intent value of the 1st device into a value ranging between '12' and '15' from '10' in order for 1st device to have the group owner intent value greater than the group owner intent value '11' of the 2nd device. On the other hand, if the 1st device is determined as the group client, the group owner intent value of the 1st device is '10', and the group owner intent value of the 2nd device is '9', the 1st device can adjust the group owner intent value of the 1st device into a value ranging between '0' and '9' from '10' in order for 1st device to have the group owner intent value smaller than the group owner intent value '9' of the 2nd device. Yet, if the 1st device is determined as the group owner, the group owner intent value of the 1st device is '10', and the group owner intent value of the 2nd device is '9', since the group owner intent value of the 1st device greater than that of the 2nd device, the same group owner intent value can be used without adjusting the group owner intent value separately. To this end, a method of setting a group owner intent value of the 1st device shall be described in detail with reference to FIG. 5 later.

Subsequently, the 1st device can send a message containing the set group owner intent value of the 1st device to the 2nd device [S430]. In particular, the 1st device can send a GO Negotiation Response message containing the group owner intent value of the 1st device set in the step S420 to the 2nd device.

Figure 5:
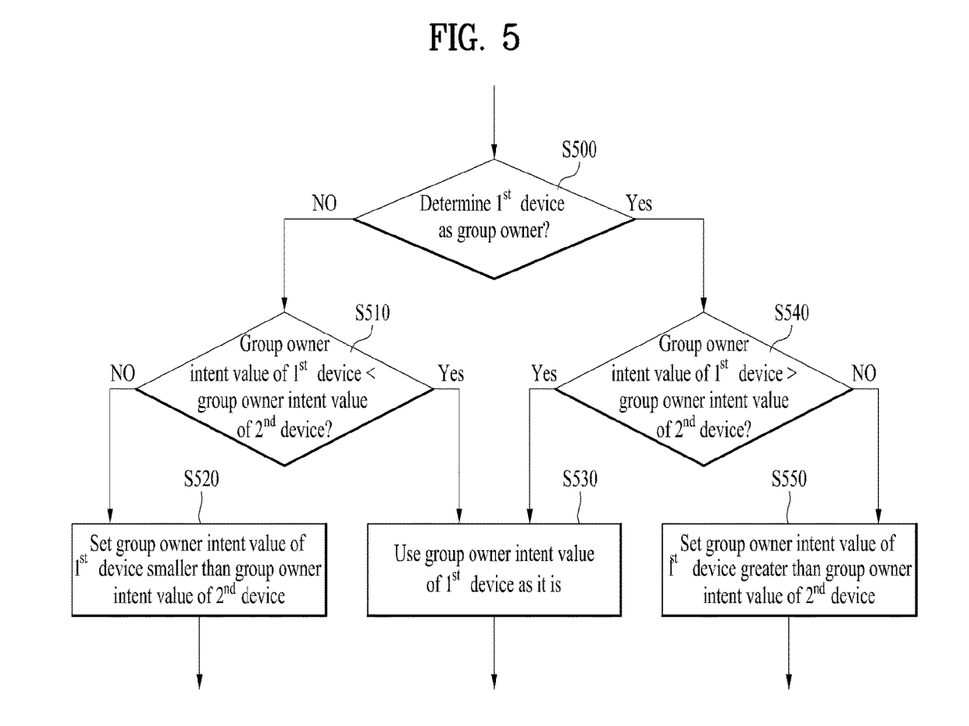
FIG. 5 is a flowchart to describe a detailed method of setting a group owner intent value according to one embodiment of the present invention.

In the following description, a method of setting a group owner intent value is explained in detail with reference to FIG. 5. FIG. 5 is a flowchart of the detailed step S420 shown in FIG. 4. And, assume that the step S410 has been performed already.

Referring to FIG. 5, the 1st device checks whether the 1st device is determined as a group owner [S500]. If the 1st device is determined as a group client [No, S500], the 1st device can compare a group owner intent value of the 1st device and a group owner intent value of the 2nd device to each other. As a result of the comparison, if the group owner intent value of the 1st device is greater than that of the 2nd device [No, S510], the group owner intent value of the 1st device can be set smaller than that of the 2nd device [S520]. On the other hand, as a result of the comparison, if the group owner intent value of the 1st device is smaller than that of the 2nd device [Yes, S510], the group owner intent value of the 1st device can be used as it is without adjustment [S530].

On the contrary, if the 1st device is determined as the group owner [Yes, S500], the 1st device can compare a group owner intent value of the 1st device and a group owner intent value of the 2nd device to each other. As a result of the comparison, if the group owner intent value of the 1st device is smaller than that of the 2nd device [No, S540], the group owner intent value of the 1st device can be set greater than that of the 2nd device [S550]. On the other hand, as a result of the comparison, if the group owner intent value of the 1st device is greater than that of the 2nd device [Yes, S540], the group owner intent value of the 1st device can be used as it is without adjustment [S530].

According to the description with reference to FIG. 5, the group owner intent value of the 1st device is set. Instead, the group owner intent value of the 2nd device can be set in a manner that the group owner intent value of the device determined as the group owner has a greater value. In this case, the set group owner intent value of the 2nd device can be sent to the 2nd device by being contained in the GO Negotiation Response message. Thus, by adjusting not the group owner intent value of the 1st device but the group owner intent value of the 2nd device, the group owner intent value of the device determined as the group owner can be set to have a greater value. Hence, if the adjustment of the group owner intent value is necessary [No, S510 or S540], the 1st device displays the group owner intent value of the 1st device and the group owner intent value of the 2nd device in order for a user to select and adjust one of the group owner intent values of the 1st and 2nd devices. And, the 1st device can receive a selection of the corresponding group owner intent value.

By the communication performing method mentioned in the above description, it is able to set a group owner intent value dynamically. Therefore, it is able to determine a group owner appropriate for a specific situation.

A communication performing procedure using Wi-Fi Direct according to one embodiment of the present invention is described in detail with reference to FIG. 6 and FIG. 7 as follows.

Figure 6:
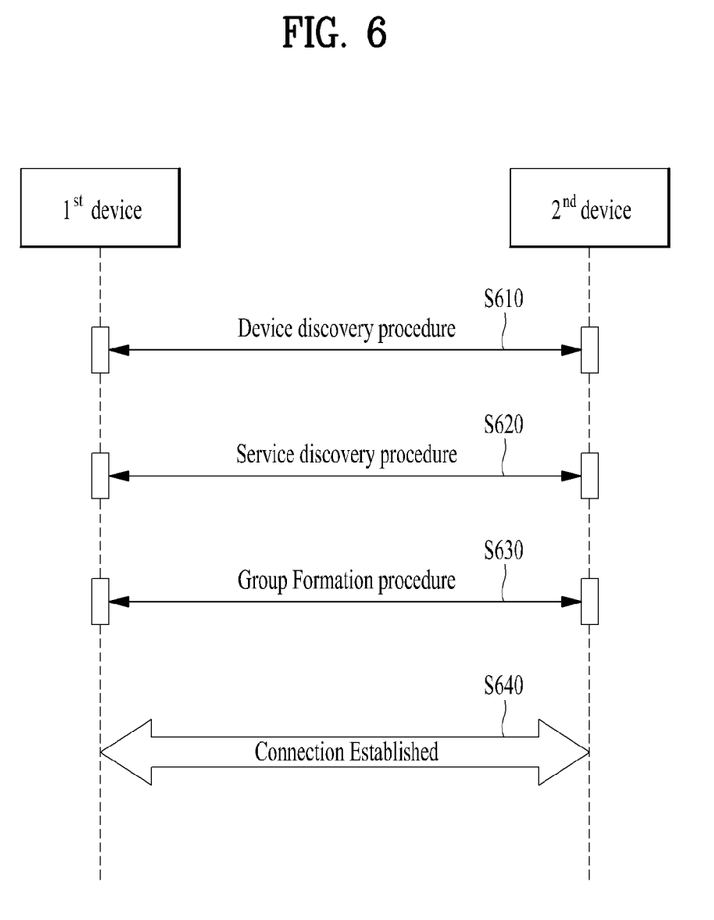
FIG. 6 is a schematic diagram of a communication performing procedure using Wi-Fi Direct according to one embodiment of the present invention.

FIG. 6 is a schematic diagram of a communication performing procedure using Wi-Fi Direct according to one embodiment of the present invention.

Referring to FIG. 6, a 1st device supportive of Wi-Fi Direct and a 2nd device supportive of Wi-Fi Direct performs a device discovery procedure [S610], a service discovery procedure [S620] and a group formation procedure [S630], thereby establishing a connection in-between [Connection Established, S640].

The device discovery procedure S610 is a procedure for exchanging information necessary for the connection by discovering a device supportive of Wi-Fi Direct. In doing so, information is mutually obtained in a manner of saving inter-device information as IE and then transceiving the saved information. Since information elements (IEs) of the above-described procedure are not directly associated with the present invention, details of the IEs shall be omitted from the following description.

Through the device discovery procedure S610, the 1st device can transceive information with the discovered 2nd device using a message format called GAS (generic advertisement service) protocol, which is called the service discovery procedure S620. According to the present invention, an operation of determining a group owner in the service discovery procedure S620 can be further performed.

The group formation procedure S630 is the procedure for forming a group between devices to be connected to each other. And, the group formation procedure 630 is the procedure for exchanging information necessary for the group formation between the devices. In this procedure, the devices can exchange information on the group formation with each other. And, the exchanged information may include a group owner intent value. According to the present invention, an operation of dynamically setting a group owner intent value in the group formation procedure S630 can be further performed.

Figure 7:
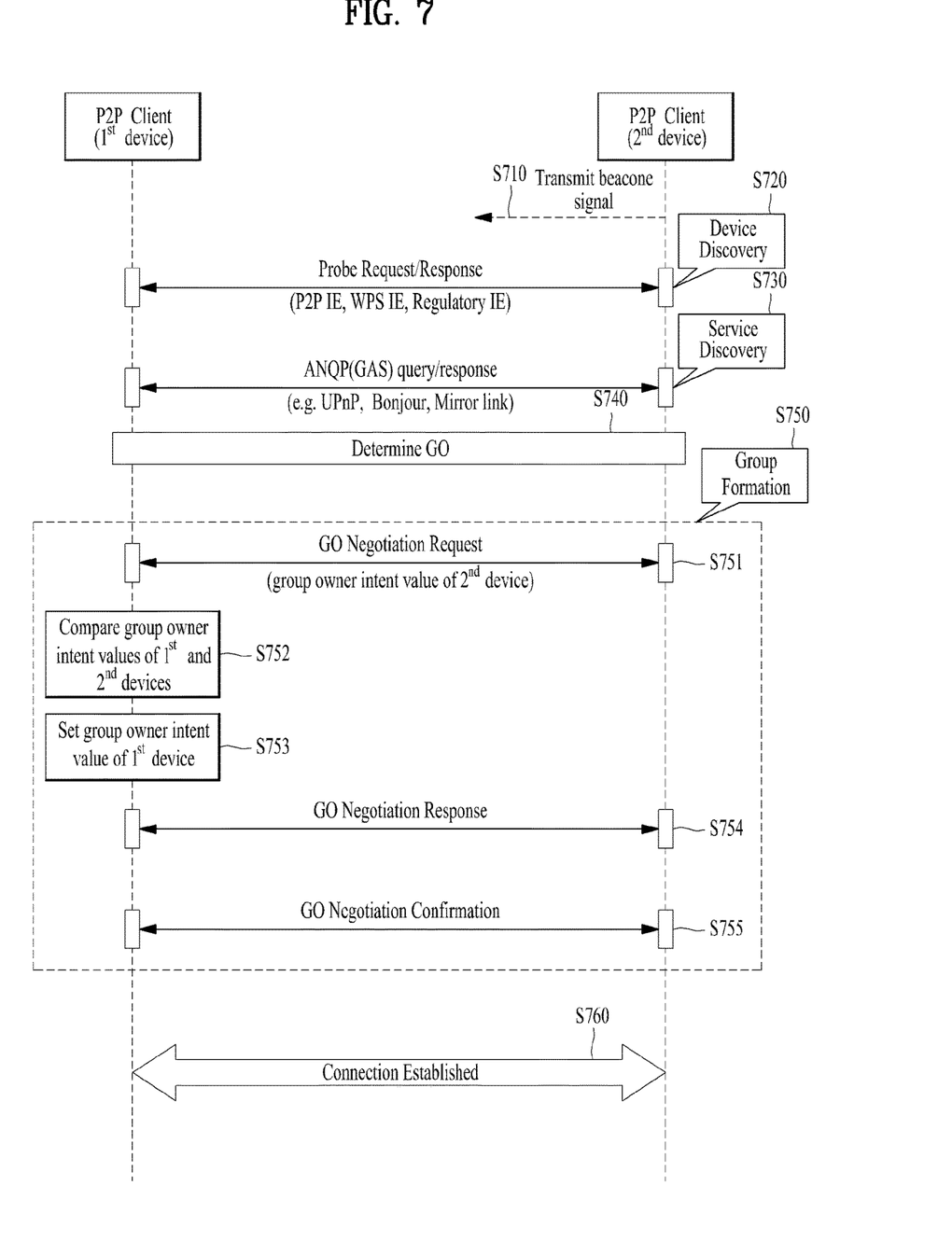
FIG. 7 is a diagram of a communication performing procedure using Wi-Fi Direct according to one embodiment of the present invention.

FIG. 7 is a detailed diagram of the communication performing procedure shown in FIG. 6.

Referring to FIG. 7, the 1st device discovers a beacon signal transmitted from the 2nd device [S710] and is then able to perform the device discovery procedure on the 2nd device [S720]. In particular, the 1st device and the 2nd device can exchange information necessary for a connection with each other by exchanging a probe request and a probe response [S720]. As mentioned in the foregoing description with reference to FIG. 6, according to this procedure, information is mutually obtained in a manner of saving inter-device information as IE and then transceiving the saved information. Since information elements (IEs) of the above-described procedure are not directly associated with the present invention, details of the IEs shall be omitted from the following description.

Subsequently, the service discovery procedure can be performed [S730]. Through the service discovery procedure, the 1st device and the 2nd device can transceive informations on a mutually supported service, sub-options and the like with each other. In doing so, the informations can be transceived using a message format called GAS (generic advertisement service) protocol. And, a GAS message can be defined in IEEE 802.11u Standard.

TABLE 5

GAS Initial Request Action Frame

| Category | Acton | Dialog Token | Advertisement Protocol IE | Query Request Length | Query Request |
|---|---|---|---|---|---|

Table 5 corresponds to one embodiment indicating a GAS message configuration. The GAS message used for a service discovery is usable for various purposes. In order to distinguish the above-mentioned various purposes, a different value can be indicated by Advertisement Protocol IE field. A message format used for one embodiment of the present invention uses an ANQP (access network query protocol) message format and the ANQP message can be indicated by the Advertisement Protocol IE field. In particular, the Advertisement Protocol IE field can be configured as Table 6 in the following. The ANQP message used by the present invention can indicate the ANQP format in a manner that a value of an Advertisement Protocol ID field of the Advertisement Protocol IE field is set to a specific value (e.g., '0').

TABLE 6

Advertisement Protocol Information Element

| Element ID | Length | Advertisement Protocol Tuple | | |
|---|---|---|---|---|
| | | Query Response Length Limit | PAME-BI | Advertisement Protocol ID |

The GAS message shown in Table 5 can indicate the ANQ message through the Advertisement Protocol IE field. And, a service information to be actually transmitted through the ANQP message can be transmitted using Query Request field of the GAS message. In particular, the ANQP message can be transmitted in a manner of being carried on the Query Request field of the GAS message. As the ANQP message has been described in detail with reference to FIG. 3 and Tables 1 to 4, its redundant details shall be omitted from the following description.

Meanwhile, the $1^{st}$ device can determine GO (group owner) in the service discovery procedure [S740]. In particular, the $1^{st}$ device can determine the GO based on the service information obtained from the ANQP message. As the GO determination has been already described with reference to FIG. 3, its redundant description shall be omitted from the following description.

Subsequently, the $1^{st}$ device and the $2^{nd}$ device can perform a group formation procedure with each other [S750]. In particular, the $1^{st}$ device can receive GO Negotiation Request from the $2^{nd}$ device [S751]. Subsequently, the $1^{st}$ device compares a group owner intent value of the $1^{st}$ device and a group owner intent value of the $2^{nd}$ device to each other [S752]. And, the $1^{st}$ device can set the group owner intent value of the device, which is determined as the group owner in the step S740, to have a greater value [S753].

The 1st device transmits GO Negotiation Response including the set group owner intent value of the 1st device to the 2nd device [S754] to enable the 2nd device to confirm the group owner intent value of the 1st device. Through the above-mentioned procedure, the 1st device and the 2nd device determine the group owner and the group client and the 2nd device then transmits GO Negotiation Confirmation to the 1st device, whereby the group formation procedure is ended [S755]. Once the group formation procedure is finished, a communication connection between the 1st device and the 2nd device can be established [S760]. Of course, although such procedures as authentication, association and the like may be performed after the group formation procedure, since such procedures are not directly associated with the present invention, details of those procedures shall be omitted from the following description.

Accordingly, in a wireless communication method according to one embodiment of the present invention, when a connection is established using Wi-Fi Direct, a device determined using a service information included in an ANQP (access network query protocol) message can be determined as a group owner without changing an existing Wi-Fi Direct specification.

In particular, after a group owner appropriate for a specific network situation has been determined, a group owner intent value can be dynamically set to determine a device, which is determined as the group owner, as the group owner. Therefore, a group operation and management can be efficiently performed.

According to one embodiment of the present invention, the above-described methods (or operational flowcharts) can be implemented in a program recorded medium with processor-readable codes. The processor-readable media may include ROM, RAM, CD-ROM, magnetic tapes, floppy discs, optical data storage devices, and the like for example and also include carrier-wave type implementations (e.g., transmission via Internet).

Configurations and methods according to the embodiments mentioned in the foregoing description are not limitedly applied to the device for performing a communication using Wi-Fi Direct but the embodiments can be selectively combined entirely or in part to enable various modifications and variations therein without departing from the spirit and scope of the invention.

What is claimed is:

1. A method for performing a D2D (device-to-device) communication of a first device including a processor, the method comprising:
   discovering a second device supportive of the D2D communication;
   receiving an ANQP (access network query protocol) message from the second device;
   checking a value of a service protocol type field in the ANQP message from the second device;
   in response to the value of the service protocol type field in the ANQP message from the second device being equal to a predetermined value indicating that the second device supports a mirroring service, extracting mirroring service information for a mirroring service supported by the second device from a query data field within the ANQP message, wherein the mirroring service information of the second device indicates at least one of a version of a mirroring service, internet connectivity sharing required information, internet access information, multiple mirroring server support information and signal strength information;
   selecting one of the first device and the second device as a server device for the mirroring service and to be set as a group owner based on comparing the obtained mirroring service information of the second device and mirroring service information of the first device;
   receiving a group owner intent value of the second device from the second device;
   in response to the group owner intent value of the server device being less than a group owner intent value of a client device among the first device and the second device and different from the server device, transmitting the group owner intent value of the server device to the client device; and
   in response to the group owner intent value of the client device being greater than a group owner intent value of the server device, changing the group owner intent value of the server device to an adjusted group owner intent value that is greater than the group owner intent value of the client device, and transmitting the adjusted group owner intent value of the server device to the client device,
   wherein the first device or the second device is a vehicle head unit.

2. The method of claim 1, wherein the ANQP message is extracted from a query request field of a GAS protocol message of a Wi-Fi service discovery procedure.

3. A first device for performing a D2D (device-to-device) communication, the first device comprising:
   a receiver configured to discover a second device supportive of the D2D communication, the receiver configured to receive an ANQP (access network query protocol) message from the second device; and
   a processor configured to:
      check a value of a service protocol type field in the ANQP message from the second device,
      in response to the value of the service protocol type field in the ANQP message from the second device being equal to a predetermined value indicating that the second device supports a mirroring service, extract mirroring service information for a mirroring service supported by the second device from a query data field within the ANQP message, wherein the mirroring service information of the second device indicates at least one of a version of a mirroring service, internet connectivity sharing required information, internet access information, multiple mirroring server support information and signal strength information,
      select one of the first device and the second device as a server device for the mirroring service and to be set as a group owner based on comparing the obtained mirroring service information of the second device and mirroring service information of the first device,
      receive a group owner intent value of the second device from the second device;
      in response to the group owner intent value of the server device being greater than a group owner intent value of a client device among the first device and the second device and different from the server device, transmit the group owner intent value of the server device to the client device, and
      in response to the group owner intent value of the client device being greater than a group owner intent value of the server device, change the group owner intent value of the server device to an adjusted group owner intent value that is greater than the group owner intent value of the client device, and transmit the adjusted group owner intent value of the server device to the client device, wherein the first device or the second device is a vehicle head unit.

4. The first device of claim 3, wherein the ANQP message is extracted from a query request field of a GAS protocol message of a Wi-Fi service discovery procedure.

5. The first device of claim 3, further comprising a transmitter configured to transmit the group owner intent value of the first device to the second device.

* * * * *